United States Patent [19]

Branlard et al.

[11] 4,339,372

[45] Jul. 13, 1982

[54] PROCESS OF PREPARING STABILIZED POLYCHLOROPRENE LATEX

[75] Inventors: Paul Branlard, Grenoble; Jean-Pierre Merle, Echirolles, both of France

[73] Assignee: Distugil, Neuilly sur Seine, France

[21] Appl. No.: 177,120

[22] Filed: Aug. 11, 1980

Related U.S. Application Data

[63] Continuation of Ser. No. 24,387, Mar. 27, 1979, abandoned.

[30] Foreign Application Priority Data

Mar. 31, 1978 [FR] France ................ 78 09449

[51] Int. Cl.$^3$ .............................................. C08K 5/44

[52] U.S. Cl. ............................ 524/169; 526/220; 524/82; 524/84; 524/99; 524/104; 524/110; 524/111

[58] Field of Search ............... 260/27 BB, 29.6 SQ, 260/29.7 SQ; 526/216, 220

[56] References Cited

U.S. PATENT DOCUMENTS

| | | | |
|---|---|---|---|
| 2,451,787 | 10/1948 | Vincent | 526/216 |
| 3,899,459 | 8/1975 | Branlard | 260/29.6 A X |
| 4,001,162 | 1/1977 | Matner | 260/29.7 SQ |
| 4,007,145 | 2/1977 | Edmondson | 526/216 |

Primary Examiner—Paul R. Michl

[57] ABSTRACT

Chloroprene is polymerized in an alkaline aqueous emulsion, containing a sulfonamide. The presence of the sulfonamide provides polychloroprene latices which are stabilized against aging.

11 Claims, No Drawings

PROCESS OF PREPARING STABILIZED POLYCHLOROPRENE LATEX

This is a continuation of application Ser. No. 024,387, filed Mar. 27, 1979, now abandoned.

BACKGROUND OF THE INVENTION

The present invention relates to an improved process of preparing a polychloroprene latex.

The polymerization of chloroprene in an alkaline aqueous emulsion in the presence of emulsifying agents is well known. Depending on the final use of the polychloroprene, various formulations have been proposed, i.e., use of dissolved sulfur or of a chain transfer agent, addition of a peptizing agent, etc., which make it possible to obtain different grades of polychloroprenes within a specified viscosity range. The main obstacle encountered by manufacturers resides in the difficulty in obtaining a viscosity whose value remains constant between the moment when the polymerization reaction is complete and the moment when the polymer is isolated from the latex. This period generally is between 10 and 100 hours. In general, the viscosity has a tendency to increase during storage. This phenomenon, which is due to a slower or faster cross-linking depending on the operating conditions, is known as the aging of the latex. The increase in the viscosity during storage may or may not be accompanied by the appearance of a gel, resulting in a partial insolubilizing of the polychloroprene in preparations for adhesives and a substantial modification of the physical and rheological properties of the polymers.

In order to overcome this aging phenomenon, it has already been proposed to polymerize the chloroprene in the presence of specific carboxylic acid amides (French Patent application No. 76.20292, and corresponding U.S. Pat. No. 4,101,481.) These amides, which are very effective in protecting the polychloroprene against aging, have, however, a drawback upon their use industrially over long periods of manufacture. As a matter of fact, a progressive, abnormally high fouling of the equipment employed to prepare the modified latices using these carboxylic acid amides is noted.

It is, accordingly, an object of the present invention to provide a process for producing polychloroprene latices which are stable during aging and storage and which do not foul the equipment employed in the process.

It is another object of the invention to provide a process for preparing a polychloroprene latex employing a sulfonamide in the aqueous emulsion used to produce the latex.

Further objects of the invention comprise the improved polychloroprene latices of the invention and adhesive mixtures containing them.

Other objects will be apparent to those skilled in the art from the present description.

GENERAL DESCRIPTION OF THE INVENTION

It has been discovered by virtue of the present invention that sulfonamides assure stability and protection against aging during storage equivalent to that of the carboxylic acid amides of the prior art, but do not result in abnormal fouling of the equipment serving for the manufacture of the latices of polychloroprene.

The sulfonamides used in the process of the present invention have the formula:

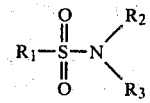

in which:

$R_1$ represents an alkyl or alkenyl $C_3$-$C_{18}$ radical, or an aryl radical, or aralkyl radical, the aryl and alkyl groups being possibly bound by an oxygen, nitrogen or sulfur heteroatom. The alkyl or alkenyl radical may be aliphatic or cycloaliphatic, linear or branched. The aryl radical can be substituted by one or more substituents such as a halogen, $-NO_2$, or a $C_1$-$C_4$ aliphatic radical. Suitable aryl radicals are, for instance, the phenyl, benzyl, naphthyl and phenanthryl groups. The aryl-alkyl radicals are preferably combinations of $C_6$-$C_{14}$ aryl groups and $C_2$-$C_6$ alkyl groups with straight or branched chain;

$R_2$ and $R_3$ in the above formula, which may be identical or different, represent hydrogen, a linear or branched $C_1$-$C_{12}$ alkyl or alkenyl radical, or an aryl radical, or an arylalkyl radical, with the conditions that if $R_2=R_3=H$, the α-carbon atom of the $-SO_2-$ group of the sulfonamide must be replaced by at least one group having a positive inductive effect, and if $R_2=H$, $R_3$, being an alkyl group, must have at least 2 carbon atoms in the event that $R_1$ has no group with positive inductive effect on the carbon α-position of the $-SO_2-$ group of the sulfonamide. $R_2$ and $R_3$, being identical or different may be substituted or not, and may be combined in a single heterocyclic group such as the pyrollyl radical. The aryl and alkyl groups can be bound by oxygen, nitrogen, or sulfur heteroatom.

The characteristics of the inductive effect, referred to above, are defined in the literature. The following works may be consulted: "Chimie Organique Moderne" (Modern Organic Chemistry), J. D. Roberts and M. C. Caserio, French Edition Ediscience (1968), pp. 387–389, and "Mecanismes Electronique en Chemie Organique" (Electronic Mechanisms in Organic Chemistry), M. Julia, Gauthier Villars Paris (1967), pp. 11–12.

The sulfonamides which satisfy the above definition have the properties in common of being insoluble in water in the concentrations used, non-hydrolyzable in caustic soda, and soluble in chloroprene. These characteristics are essential. A sulfonamide which is soluble in water or insoluble in water, but also insoluble in chloroprene, or soluble in chloroprene by hydrolyzable in caustic soda is ineffective for protection against aging.

The process of the invention comprises polymerizing the chloroprene with possibly another copolymerizable monomer in alkaline aqueous emulsion in the presence of an emulsifying agent and a free-radical catalyst, and it is characterized by the fact that about 0.2 to 4 parts by weight of a sulfonamide, defined above, are added to the emulsion for every 100 parts of monomer(s) employed. The amount of sulfonamide is preferably between about 0.5 and 2 parts by weight for 100 parts of monomer(s).

The sulfonamide may be introduced into the reaction medium at any stage of the polymerization, i.e., at the start of the reaction, during the reaction. For reasons of convenience, the addition is preferably effected upon the introduction of the reagents.

Aside from the fact that the specific sulfonamides are used, the process of the invention is carried out in accordance with conventional techniques of the emulsion polymerization of chloroprene, such as disclosed in U.S. Pat. No. 4,101,481.

Monomeric chloroprene can be replaced up to 50 percent of its weight by another monomer having at least one double bond which is copolymerizable with it. Among the monomers which are copolymerizable with chloroprene, mention may be made of the vinyl aromatic compounds, such as styrene, the vinyl toluenes and vinyl naphthalenes, the acrylic methacrylic acids, as well as their ester and nitrile derivatives, such as ethyl acrylate, methylmethacrylate, and acrylonitrile, the aliphatic conjugated diolefines, such as 1,3-butadiene, isoprene, 1-chlorobutadiene, 2,3-dichlorobutadiene, and 2,3-dimethylbutadiene, the vinyl ethers and ketones, such as methylvinyl ether, vinyl acetate, and methylvinylketone.

The polymerization is effected in aqueous emulsion using the conventional free-radical-generating catalysts. Mention may be made, in particular, of the peroxide compounds, such as the persulfates of alkali metals or ammonium, hydrogen peroxide, cumene peroxide, benzoyl peroxide, as well as the ferricyanides of alkali metals and ammonium.

The concentration of monomer present in the aqueous emulsion is not critical; it is generally between about 30 and 60 percent of the total weight of the emulsion.

The polymerization is effected in an inert atmosphere in the absence of oxygen.

The pH of the emulsion is desirably between about 11 and 13.

All conventional emulsifying agents can be used in order to prepare the chloroprene emulsion. Among them, mention may be made of water-soluble salts, in particular, the sodium, potassium, or ammonium salts of the following compounds: long chain fatty acids, rosin or derivatives of pine wood or tall-oil rosin, partially polymerized, isomerized, or dismutated rosin; fatty alcohol sulfates, alkyl sulfates and alkyl sulfonates; the alkali salts of alkyl aryl sulfonic acids as well as the condensation products of formaldehyde with aryl sulfonic acids, such as naphthalene sulfonic acid.

The customary modifying agents or other agents employed in preparing polychloroprene latices may be present in the emulsion. For example, the polymerization can be carried out in the presence of elementary sulfur or else chain transfer agents can be used, such as the alkyl mercaptans (the alkyl group having from about 6 to 14 carbon atoms), iodoform, bromoform, benzoyl iodide, bisulfide and polysulfide derivatives of dialkylxanthogen, such as diisopropylxanthogen disulfide, trisulfide, or tetrasulfide, or diethylxanthogen disulfide. So-called peptizing agents can also be added, such as the tetraalkyl thiuram disulfides or tetrasulfides, such as tetraethyl thiuram disulfide or else, at the end of the polymerization, alkali or ammonium alkyl dithiocarbamates.

Anti-oxygen compounds, such as ditertiobutylparacresol, 2,2'-methylene-bis-(6-t-butyl-p-cresol), 2,2'-thiobis(4,6-di-t-butyl phenyl), and 2,6-di-t-butyl-4-phenyl phenol can also be introduced into the latex at the time of terminating the polymerization.

The percentage of the conversion of the monomers is a function of the polymerization temperature and varies from about 70 to 85 percent.

The polymerization can be stopped at any time by a conventional polymerization inhibiting agent. The unreacted monomer is removed from the medium by flash distillation.

The introduction of the sulfonamide in accordance with the present invention is particularly advantageous for the preparation of polychloroprene latices which are to be used as adhesives. The use of polychloroprene as the base product in glues and adhesives with solvents has been known for a long time. It is known that rubber is generally mixed on the one hand with a small amount of zinc oxide and on the other hand with phenolic resins which are reacted with an excess of magnesia. However, the final adhesive mixture exhibits, at the end of a shorter or longer period of time, the undesirable characteristic of separating into two phases, which phenomenon is very disturbing commercially. French Patent application No. PV 71.45172 of Dec. 9, 1971 (corresponding U.S. Pat. No. 3,872,043), had indicated a way of avoiding this phenomenon by polymerizing the chloroprene in the presence of reduced quantities of rosin and a moderate amount of saturated or unsaturated fatty acids. However, under these conditions, and particularly when thiurams are added at the end of the polymerization, an increased natural aging of the polychloroprene is noted. French Patent application No. PV 72.24839 of July 4, 1972 (corresponding U.S. Pat. No. 3,899,459), describes a method of improving this resistance to natural aging of the polymer by the use of modified resin derivatives. However, this process requires the use of extremely pure modified resin derivatives containing no unmodified resin derivatives so that the necessity of purifying the industrial products may constitute an obstacle to their use.

The use of the specific sulfonamides in accordance with the present invention in the process of the preparation of the polychloroprene latex, using reduced amounts of resin derivatives, makes it possible to obtain, under improved economic conditions, a rubber having excellent resistance to natural aging and not resulting in the phenomenon of phase separation in the adhesives in which it is incorporated.

Thus, in accordance with one preferred embodiment, the process comprises polymerizing chloroprene in alkaline aqueous emulsion in the presence of an emulsifying system, the weight composition of which with respect to the chloroprene is about 1.8 to 3 percent resin derivatives and about 0.1 to 1 percent saturated or unsaturated fatty acids or an alkali salt of these acids, and is characterized by adding about 0.2 to 4 percent by weight, referred to the monomer, of a specific sulfonamide defined above.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

In all the examples which follow, the amounts of emulsifier, rosin, or lauryl sulfate are intentionally very low in order better to show the protective effect of the sulfonamides employed with respect to the stability on aging of the polychloroprene latices.

EXAMPLE 1

Comparative Test

Into a polymerization receptacle there are introduced:

|  | Parts by Weight |
|---|---|
| Chloroprene | 100 |
| Water | 100 |
| Resinic acids (dismutated rosin) (Phedre V ® of the Passicos Company) | 2 |
| Sodium oleate | 0.4 |
| Sodium hydroxide (100%) | 0.46 |
| Sodium salt of methylene bis-alkyl napthalene sulfonic acids (DISTABEX LS ® of Ugine-Kuhlmann) | 0.875 |
| n-dodecyl-mercaptan | 0.145 |
| with an initial catalyst composed of: |  |
| A. Ferrous sulfate (7H$_2$O) | 0.00384 |
| Disodium salt of ethylene diamine tetraacetic acid | 0.00577 |
| Sodium hydroxide | 0.00124 |
| Water | 1.026 |
| B. Dithionite | 0.0294 |
| Water | 0.588 |

The polymerization is carried out in 10 hours at +10° C., establishing a suitable rate of flow of aqueous solution of ammonium persulfate. The polymerization is stopped upon a conversion of 80 percent by the mixture:

|  | Parts by Weight |
|---|---|
| Chloroprene | 0.8 |
| Sodium lauryl sulfate | 0.02 |
| Phenothiazine | 0.01 |
| Water | 2.93 |

Finally, 0.4 part of ditertiobutyl paracresol dissolved in chloroprene (2.93 parts) are added to the latex.

The steam distillation of the residual monomer and the isolating of the polychloroprene from the latex are carried out in accordance with the methods customarily employed. In particular, the isolating of the rubber is effected by coagulation of the latex at a pH of 6 on a drum cooled to −20° C. The film obtained is washed and then dried.

EXAMPLE 2

The process of Example 1 is repeated, but 0.2, 0.5, 1 and 2 parts by weight, respectively, of N-butylbenzene sulfonamide are added to the initial emulsion.

EXAMPLE 3

(Comparative example in accordance with French Patent application No. 76.20292, corresponding U.S. Pat. No. 4,101,481.)

The procedure of Example 1 is repeated, but 0.2, 0.5, 1, and 2 parts by weight, respectively, of methyl chlorophenoxy propionamide are added to the initial emulsion.

The results of Examples 1 to 3 concerning the stability of the latex during its preparation and the resistance to aging of the polychloroprene obtained are set forth in Table 1, below.

TABLE I

| Example | Parts amide or sulfonamide introduced per 100 parts of chloroprene | Flocculation %/latex (*) | Mooney aging ΔML 1 + 4 (**) after storage of latex at 40° C. 0 | 5 hrs. |
|---|---|---|---|---|
| 1 | 0 | <0.1 | +3 | +20 |
| 2 | 0.2 | <0.1 | −3 | +15 |
|   | 0.5 | <0.1 | +1 | +7 |
|   | 1 | <0.1 | 0 | +2 |
|   | 2 | <0.1 | +3 | −1 |
| 3 | 0.2 | 0.2 | +2 | +14 |
|   | 0.5 | 0.7 | 0 | +8 |
|   | 1 | 3.8 | +3 | +6 |
|   | 2 | 6.1 | −2 | +3 |

(*) The flocculation percentage represents the percentage of dry polymer referred to the weight of latex in the condition used recovered on the walls of the reactor and of the apparatus for the steam distillation of the monomer coming from a partial coagulation of the polymer during its preparation.
(**) Mooney aging corresponds to the difference between the Mooney viscosity ML 1 + 4 (100° C.) ASTM D 1646-67 of the polymer after having been stored for 3 days in an oven at 70° C. and the Mooney viscosity ML 1 + 4 (100° C.) of the freshly isolated polymer. This difference is designated "ΔML 1 + 4 " and is given for immediate isolation of the rubber after storage for 5 hours of the latex brought to 40° C. before the isolation of the polychloroprene.

EXAMPLE 4

The action of different sulfonamides is studied in this example. The same procedure is used as in Example 1, adding each time x parts of a specific sulfonamide with the introduction of the reagents. The results are given in Table II, below.

EXAMPLE 5

The same procedure of Example 1 is repeated, except that the solution which is added at the end of the operation when the conversion of the monomer into polymer reaches 80 percent is replaced by the following:

|  | Parts by Weight |
|---|---|
| Ditertiobutyl paracresol | 0.4 |
| Tetraethyl thiuram disulfide | 0.750 |
| Sodium lauryl sulfate | 0.140 |
| Chloroprene | 5.86 |
| Water | 15 |

One test is carried out with sulfonamide and one test with 1 part of N-heptylbenzene sulfonamide.

The results are set forth in Table II, below.

TABLE II

| Sulfonamide | Parts of sulfonamide introduced per 100 parts of chloroprene | Flocculation %/latex (*) | Mooney aging ΔML 1 + 4 (**) after storage of latex at 40° C. 0 | 5 hrs. |
|---|---|---|---|---|
| Example 4 |  |  |  |  |
| N-butyl benzene sulfonamide | 1 | <0.1 | 0 | +2 |
|  | 2 | <0.1 | +3 | −1 |
| N-cyclohexyl benzene sulfonamide | 0.5 | <0.1 | +2 | +9 |
|  | 1 | <0.1 | −1 | +4 |
|  | 2 | <0.1 | +3 | +2 |
| p-chloro benzene sulfonamide | 1 | <0.1 | +2 | +6 |
|  | 2 | <0.1 | +4 | +3 |
| N-isopropyl p-tertiobutyl benzene sulfonamide | 0.5 | <0.1 | +4 | +10 |
|  | 1 | <0.1 | −2 | +2 |
| Example 5 |  |  |  |  |
| N-heptyl | 0 | <0.1 | +13 | +29 |

TABLE II-continued

| Sulfonamide | Parts of sulfonamide introduced per 100 parts of chloroprene | Flocculation %/latex (*) | Mooney aging ΔML 1 + 4 (**) after storage of latex at 40° C. | |
|---|---|---|---|---|
| | | | 0 | 5 hrs. |
| benzene sulfonamide | 1 | <0.1 | −5 | −3 |

(*) (See Table I)
(**) (See Table I)

EXAMPLE 6

The procedure of Example 1 is repeated, but the polymerization temperature is 45° C., and the conversion of the monomer into polymer is 75 percent. The amount of n-dodecyl-mercaptan is increased to 0.12 percent part per 100 parts of chloroprene introduced.

One test is carried out without sulfonamide and three tests with 0.5, 1, and 1.5 parts of n-octylbenzene sulfonamide, respectively.

The results are given in Table III, below.

EXAMPLE 7

Example 6 is repeated, but the emulsifying system is replaced by the following system:

| | Parts by Weight |
|---|---|
| Dismutated rosin | 2 |
| Crude rosin | 1 |
| Sodium hydroxide (100%) | 0.55 |

One test is carried out with sulfonamide and two tests with 0.5 and 1.5 parts, respectively, of N-isopropyl p-tertiobutyl benzene sulfonamide.

The results are set forth in Table III, below.

sifying system comprising from about 1.8 to 3 percent of rosin derivatives and from about 0.1 to 1 percent of a member selected from the class consisting of a fatty acid and an alkali salt of said acid, and a free radical catalyst, said emulsion also containing from about 0.2 to 4 parts by weight, per 100 parts of initial chloroprene monomer, of a sulfonamide which is water-insoluble, soluble in chloroprene, non-hydrolyzable in caustic soda, said sulfonamide being of the general formula:

$$R_1-\underset{\underset{O}{\|}}{\overset{\overset{O}{\|}}{S}}-N\underset{R_3}{\overset{R_2}{<}}$$

in which:
$R_1$ represents a member selected from the group consisting of a $C_3$–$C_{18}$ alkyl or alkenyl radical, an aryl radical, an arylalkyl radical, and an aryl or alkyl group bound by a heteroatom selected from the class consisting of oxygen, nitrogen, and sulfur, $R_2$ and $R_3$ represent a member selected from the class consisting of hydrogen, a $C_1$–$C_{12}$ alkyl or alkenyl radical, an aryl radical, an arylalkyl radical, and an aryl or alkyl group bound by a heteroatom selected from the class consisting of oxygen, nitrogen, and sulfur, with the conditions that (1) if $R_2=R_3=H$ the carbon in α-position of the —$SO_2$— group must be substituted by at least one group having a positive inductive effect, and (2) if $R_2=H$, $R_3$, being an alkyl group, must have at least two carbon atoms in the event that $R_1$ does not have groups with positive inductive effect on the carbon in α-position of the —$SO_2$— group of the amide.

2. A process according to claim 1, wherein the fatty acid is saturated.

3. A process according to claim 1, wherein the fatty

TABLE III

| Sulfonamide | Parts of sulfonamide introduced per 100 parts of chloroprene | Flocculation % latex (*) | Mooney aging ΔML 1 + 4 () and Gel % (*) after storage of latex at 40° C. | | | |
|---|---|---|---|---|---|---|
| | | | 0 | | 5 hrs. | |
| | | | ΔML 1 + 4 | Gel % | ΔML 1 + 4 | Gel % |
| Example 6 | | | | | | |
| N-octyl benzene sulfonamide | 0 | <0.1 | +5 | 0 | +7 | 65 |
| | 0.5 | <0.1 | −1 | 0 | +5 | 40 |
| | 1 | <0.1 | +3 | 0 | +4 | 3 |
| | 1.5 | <0.1 | 0 | 0 | +1 | 0 |
| Example 7 | | | | | | |
| N-isopropyl p-tertio-butyl benzene sulfonamide | 0 | <0.1 | −4 | 0 | +5 | 25 |
| | 0.5 | <0.1 | −6 | 0 | −1 | 10 |
| | 1 | <0.1 | −2 | 0 | 0 | 0 |

(*) (See Table I)
(**) (See Table I)
(***) The gel % corresponds to the polymer insoluble in chlorobenzene after immersion for 48 hours at room temperature.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process of preparing a polychloroprene latex, which process comprises polymerizing chloroprene in an alkaline aqueous emulsion in the presence of an emulacid is unsaturated.

4. A process according to claim 1, wherein the sulfonamide is benzene sulfonamide.

5. A process according to claim 1, wherein the sulfonamide is N-butyl-benzene sulfonamide.

6. A process according to claim 1, wherein the sulfonamide is N-cyclohexyl-benzene sulfonamide.

7. A process according to claim 1, wherein the sulfonamide is p-chloro-benzene sulfonamide.

8. A process according to claim 1, wherein the sulfonamide is N-isopropyl-p-tertiobutyl-benzene sulfonamide.

9. A process according to claim 1, wherein the sulfonamide is N-heptyl-benzene sulfonamide.

10. A polychloroprene latex prepared according to claim 1.

11. An adhesive composition containing a polychloroprene latex prepared according to claim 1.

* * * * *